July 18, 1961     A. D. SUTTLE, JR     2,992,980

APPARATUS FOR RADIATION PROMOTED PROCESSES

Filed May 16, 1957

*INVENTOR.*
ANDREW D. SUTTLE JR.,
BY *Carl G. Ries*
ATTORNEY.

United States Patent Office 2,992,980
Patented July 18, 1961

2,992,980
APPARATUS FOR RADIATION PROMOTED PROCESSES
Andrew D. Suttle, Jr., Baytown, Tex., assignors by mesne assignments, to Esso Research and Engineering Company, Elizabeth, N.J., a corporation of Delaware
Filed May 16, 1957, Ser. No. 659,639
9 Claims. (Cl. 204—193)

This invention concerns a technique for carrying out chemical processes which are promoted by radiation. In particular, the invention concerns a reactor employing beta emitting material as the radiation source. It is a particular feature of this invention to provide a reactor of the character indicated in which the beta emitting material is supported completely within the reactor in the form of thin bodies of the material.

This application is a continuation-in-part of application Serial No. 460,868, filed October 7, 1954, for Andrew D. Suttle, Jr., entitled "Chemical Reactor for Radiation Promoted Processes," now abandoned.

At the present time, it is known that many chemical conversion reactions such as isomerization, sulfochlorination, polymerization, depolymerization, etc. can be promoted by subjecting the material or materials to be converted to irradiation by high energy electrons. In general, electron bombardment of compounds such as hydrocarbons results in the formation of electrons, ions, free radicals, and excited molecules and atoms. These products of electron bombardment are exceedingly reactive, resulting in the formation of conversion products in reaction times which may well be less than one second. Polymerization, dimerization, and isomerization processes may be identified as exemplary.

Heretofore the possibility of commercially conducting such radiation promoted processes has appeared remote. This is due in part to the complexity of obtaining a suitable source of high energy electrons.

For a number of reasons it is not practical to employ electron generators such as the Van de Graaff generator, linear accelerators, or the betatron. Aside from the expense of such generators, practical difficulties are encountered in transmitting the electrons produced into a reaction zone. This can ordinarily only be accomplished by positioning the material to be converted in a reactor provided with "windows" of a substance through which the electrons can penetrate. The necessity of providing radiation transparent material in such reactors is a severe practical limitation to the possibilities of use. This is particularly true since for particular conversion processes it may be desirable to use temperatures ranging all the way from that of liquid nitrogen upwardly to 800° C. or higher. Similarly, it is frequently desirable to employ extremely high pressures. Clearly, it is quite difficult to provide a reactor of the character indicated equipped with radiation transparent windows which can be used under such extreme conditions. This is true in part since attempts to design such reactors obviate the purpose intended by requiring windows of sufficient thickness and strength so that absorption of radiation passing therethrough becomes prohibitive. It is again apparent that any design which can be made seriously limits the quantity of radiation which may be introduced into the reaction zone since it is not practical to entirely bound a reaction zone with the radiation transparent material.

In accordance with the present invention, a radiation promoting reactor is provided which contains thin bodies of beta emitting material supported completely within a reactor. The possibility of using beta emitting material is particularly attractive because of the availability of such material as the fission products of atomic reactions. As is generally known, fission products are now produced in sufficient quantities so that these products are not only cheap but involve an actual problem of disposal. It is a particular feature of this invention therefore to provide a practical use for fission products in promoting chemical reactions.

The particular beta emitting material to be employed may be selected from a wide variety of radioactive isotopes such as $Sr^{89}$, $Sr^{90}$—$Y^{90}$, $Y^{91}$, $Ru^{103}$, $Ru^{106}$, $Rh^{106}$, and $Ce^{144}$—$Pr^{144}$. For the purposes of this invention, it will of course be desirable to select particular beta emitting isotopes, such as those identified, which have a long life. In general, a material will be chosen having a half life of at least thirty days. Actually, beta emitting radioactive isotopes can be selected having a half life of approximately 25 years.

It is one of the advantages of using beta emitting materials in accordance with this invention that the reactor in which these materials are employed requires little shielding. This is particularly true with respect to hydrocarbon reactants and other reactants composed of atoms of comparatively low atomic number (e.g., about 20 or less) in that few bremsstrahlung are produced. This is due to the fact that beta emission has a relatively short range. In particular the range of beta radiation is a great deal shorter than that of gamma radiation so that the problems of handling these materials safely are considerably simplified. The range of beta radiation is of the order of approximately one gram per square centimeter.

While the short range of beta radiation is a real advantage as regards the shielding of reactors using beta emitters, at the same time the short range of beta radiation imposes real problems in designing a suitable reactor using beta emitting material. It would not be practical, for example, to attempt to position the beta emitting material behind the ordinary windows supplied in the walls of radiation promoting reactors. For one thing, the thickness of the windows required, since they make up a portion of the reactor itself and must withstand the reaction pressures, would be prohibitive, resulting in absorption of substantial portions of the beta energy because of the short range of this energy. Again, it would be impractical to position sufficient thicknesses of beta emitting material behind such localized windows so as to attain high intensity levels within the reactor, much of the radiation would then be absorbed by the beta emitting material itself.

In considering these factors, it is the particular concept of this invention to employ the beta emitting material in the form of thin bodies such as sheets, films, screens, etc. These bodies are positioned completely within the reactor vessel. Since the thin bodies of emitting material are positioned completely within the reactor, it is unnecessary to fabricate these thin bodies of the strength which would be required were they to be used as elements of the reactor walls. Again, this provision avoids the difficulties normally encountered in constructing a reactor of two or more different materials due to the temperature expansion problems and so on.

The particular manner in which the thin bodies of the beta emitting material are fabricated depends in part upon the particular beta emitting isotope which is chosen. While it would appear desirable to fabricate these sheets consisting of 100% pure beta emitting material this is not ordinarily practical. For one thing, beta emitting isotopes have a variety of physical properties but often are not ordinarily suitable for fabrication into the form of self-supporting, thin sheets. Even in the case of those metallic beta emitters which might be employed, a difficulty encountered is the reactivity of these materials in the ordinary reactant system. Consequently while it is within the scope of this invention to employ thin bodies of material fabricated solely from the beta emitting material this is not ordinarily carried out.

In the preferred form of this invention, the isotope constituting the beta emtiting material is formed into a sheet which is sandwiched between thin sheets of beta transparent metal. In general, the supporting sheets of metal between which the beta emitting material is positioned are about 0.001 inch thick to about 0.1 of an inch thick. The particular metal composing the supporting metal sheets is chosen with regard to the reactants which are to be processed. It is clearly necessary to select the metal so that it will not be attacked or reactive with the particular reaction system. In addition, it is necessary to select the metals in view of their radiation transmitting characteristics. In this connection, among the metals which can be employed as the supporting sheets, aluminum, stainless steel, and beryllium are particularly attractive for use. Stainless steel is particularly useful since this metal can be fabricated as an extremely thin sheet having a thickness of about 3 to 5 thousandths of an inch while still providing all the strength required for the purposes of this invention. Again, stainless steel is normally non-reactive in most reaction systems to which this invention has application.

While as indicated, the preferred technique of this invention requires the disposition of the beta emitting material between thin sheets of metals, it is within the scope of this invention to plate supporting sheets, screens, etc. with the beta emitting material or to alloy the emitting material in a supporting metal sheet, screen, etc.

In order to show the practical applications of this invention, reference will be made to the accompanying drawings in which:

FIG. 1 illustrates in cross-sectional elevational view a reactor constructed in accordance with this invention;

FIG. 2 diagrammatically illustrates a sheet of the emitting material;

Figure 1:
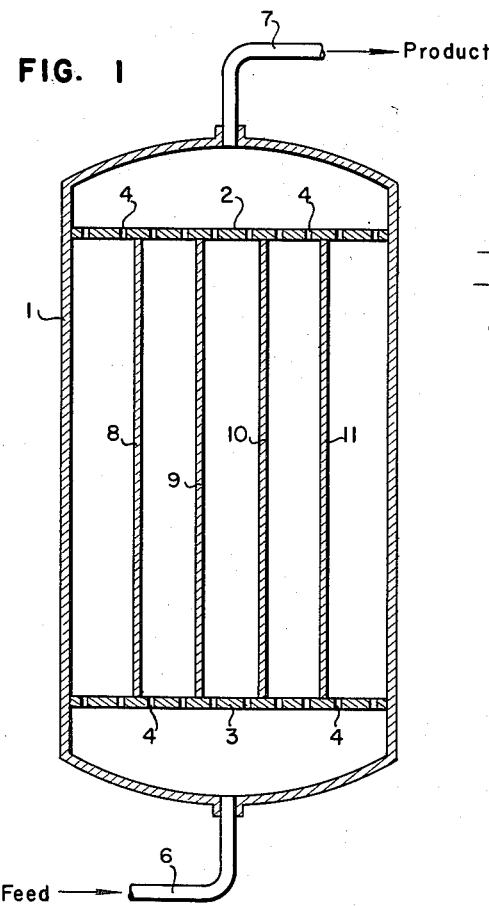

In FIG. 1, the numeral 1 designates a reactor shell. This reactor shell may be constructed of any desired type of material in any design so as to provide the necessary structural requirements of the particular reaction system. Transversely disposed across reactor 1 are upper and lower support grids 2 and 3. As illustrated, these are perforated with perforations 4 so that reactants may flow readily through these support members. The sheets of beta emitting materials are disposed between the supporting members 2 and 3. These sheets of beta emitting material are indicated by numerals 8, 9, 10 and 11. While these sheets are illustrated as being parallel to each other, it is apparent that a variety of arrangements for these sheets could be made. For example, the sheets of beta emitting material could be arranged as concentric cylinders within the reactor, as a continuous spiral of material arranged within the reactor or in other desired forms. It is also to be understood, of course, that forms other than sheets can be employed if desired including screens, ribbons, tubes or rods. It is particularly desired to position the sheets of radiation emitting material sufficiently within the reactor so as to be spaced a substantial distance from the walls of the reactor. A suitable spacing is about 2 or 3 to 5 half thicknesses of the radiation emitting material from the wall. This provision can be followed so as to eliminate any need for particular shielding precautions of the reactor as a whole.

The spacing between the sheets of beta emitting material will be determined in large part by the reaction system in which the reactor is to be employed. For example, the range of beta radiation in a liquid is substantially less than that in a gas. Consequently, in the case in which a liquid phase reaction is carried out in the reactor, it is desirable to space the sheets of beta emitting material relatively close together, e.g., between 1 mm. and 5 cm. apart. Again, the spacing of the sheets of radioactive material will depend in part upon the particular reaction as regards the intensities of radiation required to suitably effect conversion. Greater spacings can be employed for those reactions which require lower levels of energy for conversion.

In order to diagrammatically indicate the use of reactor 1, a feed inlet line 6 is shown at the bottom of the reactor together with a product withdrawal line 7 at the top of the reactor. Thus, as illustrated, feed reactants can be brought into the bottom of the reactor and will be distributed by the supporting grid or plate 3 through the perforations 4 so as to pass between the sheets of radioactive emitting material. The products of this conversion will be passed through perforations 4 of the upper supporting grid 2 and can be removed from the vessel through line 7.

Figure 2:
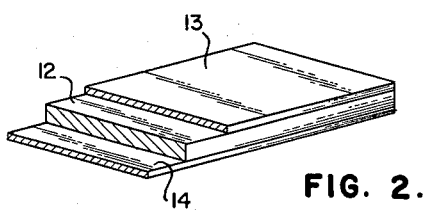

Referring now to FIG. 2, one of the methods of suitably fabricating the sheets of beta emitting material used in the apparatus of FIG. 1 is illustrated. In FIG. 2 the sandwich-type construction formerly described is illustrated. In this arrangement a central layer of beta emitting material identified by numeral 12 is positioned between two thin sheets of a supporting metal. This layer will be no more than 2 half thicknesses of the beta emitting material thick providing a thickness ranging up to about 0.1 of an inch. The supporting metal sheets are identified by numbers 13 and 14. The fabrication technique of FIG. 2 is, of course, particularly adapted to the case in which the beta emitting material can be fabricated as a sheet material. If this is not the case, the sheets of metal 13 and 14 can be employed in a similar fashion so as to encapsulate the radioactive material.

Figure 3:
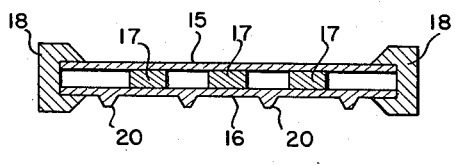
FIG. 3 illustrates a modified sheet construrction which may be employed.

Referring now to FIG. 3 of the drawing, one of the many alternative ways in which the radiation emitting material may be supported is illustrated. In the arrangement of FIG. 3, two sheets of sandwiching metals 15 and 16 are again employed. However, in this particular arrangement at least one of these sheets of metals is provided with stiffening ribs. These stiffening ribs may be made integral with the sheet of metal itself as illustrated in the drawing so as to have the corrugations or strengthening elements designated by number 20. Alternatively, of course, strengthening elements can be welded to, bolted to or otherwise fixed to the metals to be strengthened. In the fabrication method of FIG. 3 due to the absorption of radiation which would occur by the strengthening members, it is desirable that the radioactive material be distributed at centralized locations between the strengthening members. This is illustrated in the drawing where localized concentrations of radioactive material, identified by numerals 17, are shown. Preferably the volume between the localized portions of radioactive material is evacuated since this eliminates useless absorption of energy by filler material which can alternatively be employed. Clamping and sealing members 18 are provided about the periphery of the sheets.

As described, this invention entails the use of thin bodies of beta emitting material. This may be achieved in a wide variety of methods. A preferred technique concerns the sandwiching or encapsulating of the emitting material between thicknesses of a supporting material. By the provisions of this invention it becomes practical to expose reactants to a large area of emitting surface.

Figure 4:
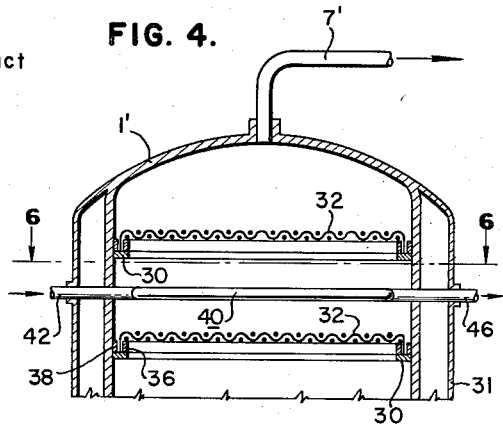
FIG. 4 illustrates in fragmentary cross-sectional elevational view a modified reactor of the present invention.

With reference to FIG. 4, there is shown a fragmentary elevational view of a modified reactor of the present invention wherein screens of a beta emitting material are employed. In accordance with this showing, a reactor shell 1' is provided which may, for example, have a circular cross-sectional configuration. The shell 1' is provided with suitable reactants inlet means (not shown) and a reaction product outlet line 7' or a plurality of such lines. The interior of the shell 1' is provided with a plurality of longitudinally spaced lateral support means such as support rings 30 adapted to support transversely disposed bodies of beta emitting materials such as members containing screens 32 of a beta emitting material such as Ruthenium 106.

Figure 5:
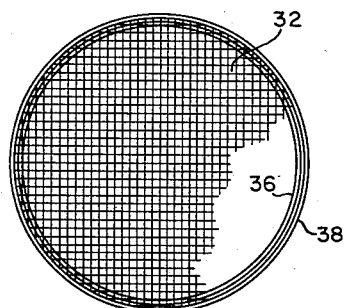
FIG. 5 is an elevational view of an element of the reactor of FIG. 4.

The screen members 32 may be of any suitable construction. Thus, for example, as shown in FIG. 5, a screen 32 of Ruthenium 106 or a plurality of such screens may be supported by an inner support ring 36 and secured thereon by means of an outer retaining ring 38. In order to provide for the most efficient use of the beta emitting material, it is preferable that the screen be composed of comparatively fine wires of about 0.002 to 0.010 cm. diameter and have a mesh width of about 1 to 3 half thicknesses of the beta emitting material.

With a reactor having the construction shown in FIG. 4, it is possible to provide for highly agitated flow of the reactants through the reactor.

Figure 6:
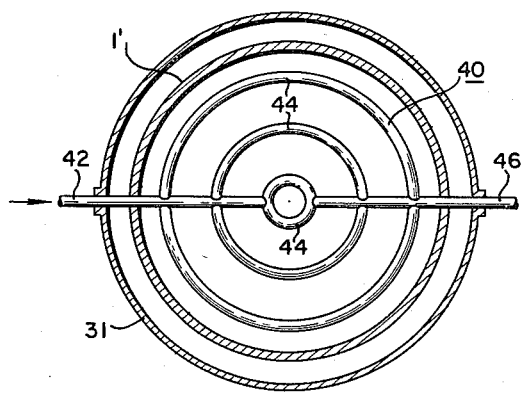
FIG. 6 is a cross-sectional view of the reactor of FIG. 4 taken along the lines 6—6.

In situations wherein highly exothermic reactions are involved, such as in the sulfochlorination of hydrocarbons, the heat of reaction may be removed by jacketing the reactor in any suitable manner such as with a jacket 31 and flowing a cooling medium through the jacket 31. As a supplementary or alternate cooling means there may be provided a cooling coil 40 intermediate one or more pairs of screen members 32. Thus, as is shown more clearly in FIG. 6, the cooling coil 40 may comprise an inlet line 42 fluidly interconnected with a plurality of branch coil lines 44, the lines 44 being fluidly interconnected with a discharge line 46.

When it is desired to supply heat to the shell 1', the jacket 31 and/or the coil 40 may be utilized as a heating means.

The invention will be further illustrated by the following specific examples which are given by way of illustration and not as limitations on the scope of this invention.

*Example I*

Flow a mixture of equimolar amounts of sulfur dioxide, chlorine and n-heptane cooled to a temperature of about 0° C. through a reactor constructed in the manner shown shown in FIG. 4 while maintaining the reaction mixture below the boiling point of the n-heptane by passing a suitable coolant (e.g., ice water) through cooling coils 40. The reactor 1' may have an internal diameter of about 50 cm., an overall length of about 10 to 100 cm., and contain a total of about 3 to 20 of the ruthenium screen members 32 whereby, with a reactants flow rate of about 1 to 10 liters per minute, about 50 curies of beta radiation per mol of reactants present is provided. The product comprises unreacted heptane, chlorine and sulfur dioxide, together with heptane sulfonyl chloride and heptyl chlorides, the heptane sulfonyl chloride being obtained in about 80% yield.

*Example II*

An ethylene polymerization catalyst of the type disclosed and claimed in copending Schutze et al. application S.N. 538,518, filed October 4, 1955, now abandoned, is prepared by flowing a 3 volume percent solution of titanium tetrachloride in n-heptane at a temperature of about +10° C. through a reactor constructed in the manner shown in FIG. 1, the reactor being provided with sandwich-type sheets as shown in FIG. 2 containing a central layer of $Sr^{90}$—$Y^{90}$ positioned between stainless steel sheets. Thus, there may be used a total of $10^4$–$10^7$ curies of $Sr^{90}$—$Y^{90}$ fabricated into a plurality of sheets having a thickness of 0.2 to 2 half thicknesses of $Y^{90}$, such sheets being encased between stainless steel supporting sheets having a thickness of about 0.01 to 0.2 half thickness of $Y^{90}$. The rate of flow of the heptane solution through the reactor with a residence time of 5 to 10 minutes should be sufficient to provide for about $3 \times 10^4$ curies of beta radiation per gram of $TiCl_4$, whereby the titanium tetrachloride is reduced to an activated form of titanium trichloride useful for the low temperature polymerization of ethylene.

What is claimed is:

1. Apparatus for conducting a beta-radiation promoted process comprising a closed, essentially unshielded housing vessel adapted to sustain the temperatures and pressures required for the process, means for introducing and removing reactants and products from the reactor, a thin body of metal positioned within said vessel comprising, as the sole radioactive material, a metal emitting substantially exclusively high energy beta radiation and means for supporting said thin body of material within said vessel at a distance from said housing greater than the beta radiation range of said thin body of metal, said thin body of metal having a thickness of not more than about two half-thicknesses of said beta-emitting metal.

2. The apparatus defined by claim 1 in which said means for supporting the emitting material comprises means to suport thin solid sheets of the emitting material.

3. The apparatus defined by claim 1 in which said means for supporting the thin film of emitting material comprises a pair of radiation transparent metal sheets between which the beta emitting material is positioned.

4. The apparatus defined by claim 1 in which the said means for supporting the beta emitting material comprises thin metallic plates in which the said beta emitting material is alloyed.

5. The apparatus defined by claim 1 in which the said means for supporting a thin film of beta emitting material comprises metallic sheets including stiffening members spaced along at least one side of each of said sheets and including provision for concentrating and localizing the position of the beta emitting material between said stiffening members.

6. The apparatus defined by claim 1 in which the beta emitting material is a sheet of $Sr^{90}$—$Y^{90}$ having a thickness of 0.2 to 2 half thicknesses of $Y^{90}$ and wherein the means for supporting the said sheet comprises a pair of stainless steel sheets having a thickness within the range of about 3 to 5 thousanths of an inch between which said sheet is positioned.

7. Apparatus for conducting radiation promoted processes comprising a closed, substantially unshielded elongate housing adapted to sustain the temperatures and pressures required for the process, a plurality of screen members comprising a body of material emitting substantially exclusively high energy beta radiation, means for supporting said screens in spaced relationship to each other transversely of the length of said housing, means adacent one end of said housing for introducing reactants, and means adjacent the other end of said housing for removing reactants and reation products, said screens having a diameter within the range of 0.002 to about 0.10 centimeters and having a mesh width within the range of about 1 to 3 half thicknesses of the beta emitting material.

8. A device as in claim 7 including means for regulating reaction temperature parallel with and intermediate at least a pair of adacent screens in said reactor.

9. A device as in claim 7 wherein the beta emitting material is ruthenium.

References Cited in the file of this patent

UNITED STATES PATENTS 1,627,938    Tingley  ---------------  May 10, 1927

(Other references on following page)

UNITED STATES PATENTS

| | | |
|---|---|---|
| 1,718,899 | Fischer | June 25, 1929 |
| 1,991,934 | McCray | Feb. 19, 1935 |
| 2,326,631 | Fischer | Aug. 10, 1943 |
| 2,559,793 | Pregel | July 10, 1951 |
| 2,575,134 | Schultz et al. | Nov. 13, 1951 |

FOREIGN PATENTS

| | | |
|---|---|---|
| 476,331 | Canada | Aug. 21, 1951 |
| 1,060,517 | France | Apr. 2, 1954 |
| 708,901 | Great Britain | May 12, 1954 |
| 278,347 | Great Britain | May 10, 1928 |
| 749,513 | Great Britain | May 30, 1956 |